WITNESSES:
Bernard R. Giegucz
James F. Young

INVENTOR
Martin Green
BY Charles F. Renz
ATTORNEY

Dec. 31, 1968 M. GREEN 3,419,747

IMAGE COMPARISON

Filed March 16, 1965 Sheet 2 of 2

United States Patent Office 3,419,747

Patented Dec. 31, 1968

3,419,747

IMAGE COMPARISON

Martin Green, Elmira, N.Y., assignor to Westinghouse Electric Corporation, Pittsburgh, Pa., a corporation of Pennsylvania Filed Mar. 16, 1965, Ser. No. 440,076

8 Claims. (Cl. 315—11)

ABSTRACT OF THE DISCLOSURE

An image comparison system which utilizes a storage target onto which a first and second electron image are directed at different times to obtain a difference signal or image between the first and second image. The system utilizes a secondary electron conduction type storage target which permits the bombardment of the target by both the first and second electron images to be substantially of the same velocity and yet still permit the charging of the storage target in opposite directions. An electron scanning beam may be utilized to derive the difference in the two charge images from the storage target.

This invention relates to methods and apparatus for comparison of time sequentially registered information and more particularly to methods and apparatus for deriving a differential electrical signal.

This invention is applicable to systems for detection of motion within a scene. Detecting motion in a scene can be made by determination of the points of difference in signal between two static images. Most present systems performing this task utilize an electro-optical device in which a first static image of the scene is stored. A second static image of the same scene later in time is obtained and the polarity of the signal of the second static image is reversed with respect to the signal of the first image. The two signals are combined and a difference signal is obtained which is representative of the difference in signals and, will, indicate any motion. To avoid generation of false difference signals at least two requirements must be met. Firstly, the two channels which handle the images separately before combination must have transfer characteristics that are nearly identical. Secondly, accurate registration between the two images must take place at the instant they are combined. Many existing devices use a storage tube to preserve the first image until it is required for comparison with the second image. The comparison itself is carried out by recovering the first image from the storage tube and turning it back into a video signal (with the appropriate polarity) before adding the signal to the video signal corresponding to the second image.

This invention is directed to method and apparatus wherein this comparison process is carried out on the storage target of the pick-up tube and the difference signal can be read out directly from this storage target. The elimination of one stage in the signal handling process will reduce distortion and improve registration. A further advantage of this invention is that the video signals are no longer essential to the functioning of the device. A simple indication of a moving object can be provided by reading out the residual signal on the target of the pickup tube without the use of deflection circuitry or video amplifiers. Since the pickup tube has a direct optical input, a separate camera tube is not required for the construction of the complete system.

It is accordingly an object of this invention to provide an improved comparison system.

It is another object to provide an improved method of comparing images.

It is a further object to provide an improved system for detection of movement within a scene being viewed by a pickup system and transmitting from the detection system only those signals which indicate movement within the scene being viewed.

It is another object to provide a system for viewing time presented scenes, comparing these scenes within a pickup tube on a storage target and then deriving a signal from said pickup tube representing difference in the two scenes.

It is still a further object to provide a high resolution pickup system for comparison of two time spaced scenes presented to said pickup system.

It is another object to provide a method of comparing two scenes utilizing a high resolution image detection device.

Briefly, the objects of this invention are accomplished by providing a radiation detection system which utilizes a secondary electron conduction type of storage target in which electron images corresponding to a first and second scene are directed onto the target at different times and at similar electron voltages. A grid electrode is positioned on the opposite side of the secondary electron conduction target from the source of the electron images so as to change the direction of charging of the surface of the secondary electron conduction target on the side opposite with respect to the electron image inputs with respect to the two images. An electron beam scanning system may be utilized to readout the difference in charge between the two images established on the storage target by the two electron images.

Further objects and advantages of the invention will become apparent as the following description proceeds and features of novelty which characterize the invention will be pointed out in particularity in the claims annexed to and forming a part of this description.

For a better understanding of the invention, reference may be had through the accompanying drawings in which.

Figure 1:
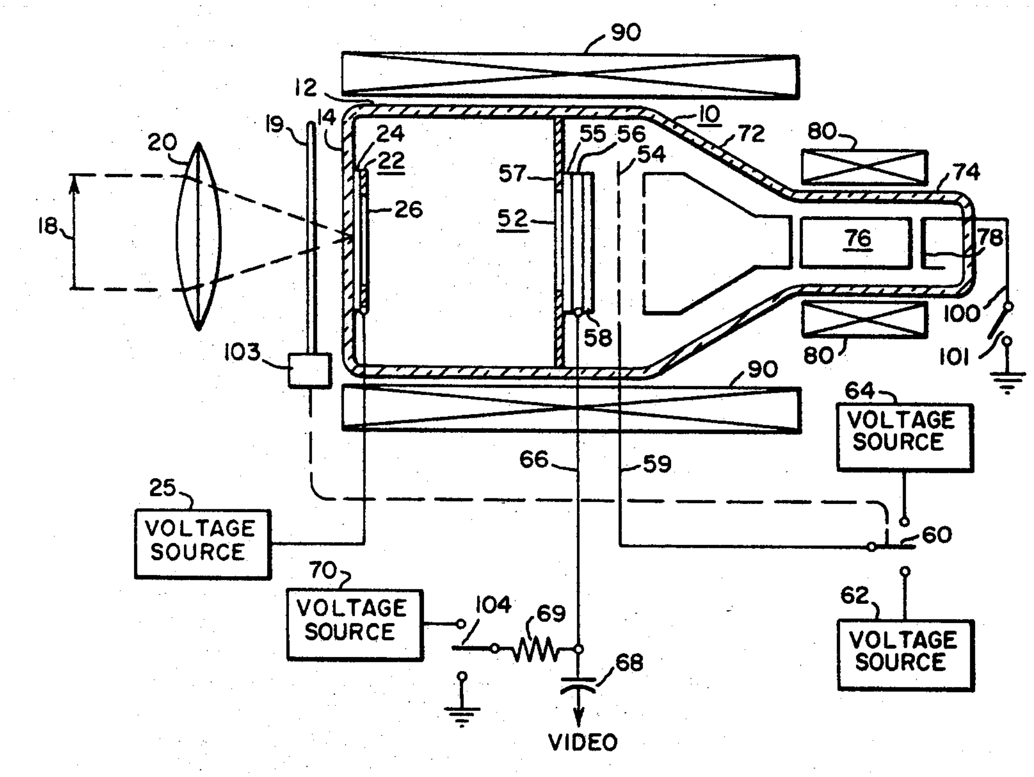
FIGURE 1 is a schematic illustration of a comparison system incorporating the teachings of this invention.

Referring in detail to FIGURE 1, there is illustrated a comparison system. The system includes an evacuated envelope 10. The envelope 10 consists of a cylindrical wall portion 12 closed at one end by a face-plate 14. The face-plate 14 is transmissive to the radiations directed onto the envelope 10 from the scene 18. A suitable lens system 20 is provided between the scene 18 and the face-plate 14 for focusing the radiation onto a photocathode 22 provided on the inner surface of the face-plate 14. A shutter 19 is also provided between the scene 18 and the photocathode 22 for control of the exposure of the photocathode 22 by radiations from the scene 18. A light source 103 such as a lamp is provided to flood the photocathode 22 uniformly with light. The output of the lamp 103 is such as to excite the photocathode 22. The face-plate 14 may be of a suitable material such as glass in the case of a visible scene. The photocathode 22 consists of a suitable photoemissive coating 24 sensitive to the input radiation. Cesium antimony is a suitable photo surface for a visible light input and may be evaporated onto the inner surface by well known techniques. A suitable electrically conductive contact to the photoemissive coating 24 which may be in the form of a conductive ring 26 may be provided. A lead-in member 28 is connected to the ring 26 and connected to a suitable potential source 25. The source 25 provides a potential of about 6000 volts negative with respect to ground to the photocathode 22.

A target 52 is also provided within the cylindrical portion of the envelope 10 and is spaced from the photocathode 22. The target 52 consists of a support film 55 of a suitable material such as aluminum oxide of about 500 angstroms in thickness. The film 55 is supported on a ring member 57 of about 1 inch diameter and of a suitable material such as Kovar alloy (Westinghouse Electric Corporation trademark for an alloy of nickel, iron and cobalt). A layer 56 of a suitable electrically conductive material such as aluminum is deposited on the aluminum oxide layer 55. The thickness of the aluminum layer 56 is about 500 angstroms and may be deposited thereon by vacuum evaporation techniques. Deposited on a porous coating 58 of a suitable material such as potassium chloride is deposited on the conductive layer 56. The coating 58 may be formed by evaporating the potassium chloride in an inert gas atmosphere at a pressure of a few millimeters of mercury. The density of the layer 58 is only about two percent of the bulk density of potassium chloride. A typical thickness is 25 microns which correspond to a mass per unit area of 100 micrograms per square centimeter. The bulk potassium chloride density is 1.984 gram per cubic centimeter.

The porous coating 58 is of a suitable insulating or semiconducting material which exhibits the property of generation of electrons in response to electron bombardment of one surface which may be emitted as secondary electrons from the opposite surface and also permitting the flow of the secondary electrons through voids in said layer at low field strengths ($10^4$ volt-cm.). The coating 58 may be of any suitable material such as an alkali or alkali earth metal compound and in addition to potassium chloride, magnesium chloride or magnesium oxide may be utilized. The layer has a resistivity of $10^{17}$ ohms centimeter.

A mesh or screen electrode 54 is positioned adjacent to the insulating coating 58 and serves as the collector for secondary electrons emitted from the exit or exposed surface of the coating 58. The mesh 54 is positioned at about 0.095 inch from the insulating coating 58. The mesh 54 also contributes to maintaining a uniform electric field at the surface of target member 52. The mesh electrode 54 is connected by a lead-in member 59 to a switching member 60 external of the envelope. The switching member 60 provides means of connecting the mesh 54 to a voltage source 62 or a voltage source 64. The voltage source 62 provides a negative potential with respect to ground of about 300 volt and the voltage source 64 provides a positive potential with respect to ground of about 35 volts.

The conducting coating 56 on the target 52 is also connected by means of a lead-in member 66 to a switch 104 external to the envelope. The switch allows the lead-in member 66 to be connected either to a potential source 70 which provides a potential of about 2 volts negative with respect to ground or to ground. The video signal is derived from the target means 52 by suitable circuit means illustrated as a capacitor 68 and resistor 69 combination connected to the lead 66.

The cylindrical envelope portion 12 is provided with a funnel portion 72 and neck portion 74 which is closed at the end to form the remainder of the envelope 10. An electron gun 76 is positioned within the neck portion 74. The electron gun 76 includes at least a cathode 78 which is connected to ground through a lead-in member 100 and a switch 101.

Positioned about the envelope 10 is a suitable magnetic field producing means which may be in the form of an electromagnetic coil 90. A suitable permanent magnet assembly may be used of the type described in the copending application Ser. No. 61,289, filed October 7, 1960, now Patent No. 3,155,860, entitled "Continuously Permanent Magnet for Imaging Purposes" by G. W. Goetze and assigned to the present assignee. The magnetic field producing means provides a uniform magnetic field perpendicular to the target assembly 52 and to the photocathode 22. A magnetic field utilized in this application is about 100 gauss in order to provide resolution within the image section, that is, between the photocathode 22 and the target 52.

In the specific embodiment shown a suitable electromagnetic deflection system 80 is provided around the neck portion 74 for deflecting the electron beam generated by the electron gun 76. The deflection system 80 is provided with suitable electrical signals in a well known manner to scan the electron beam from the electron gun 76 over the target 52. In addition to electromagnetic deflection of the electron beam as illustrated in the specific embodiment, elestrostatic deflection may be also utilized. In addition, a photoemissive surface of substantially the same area as the target member 52 could be provided within the scanning section of the tube and a flying spot light scanner could be provided exterior of the envelope for exciting the photoemissive surface to provide a scanning electron beam for reading out the image on the target 52. This would permit an increase in magnetic field in the image section. It is also possible to utilize an electron gun in the place of the photocathode 22. The input would then be in the form of video electrical signals which would be applied to the electron gun. Suitable deflection means would provide deflection of the electron beam over the target.

Operation of the device requires the performance of a four part cycle. The four stages consist of (1) writing of the first image, (2) writing of the second image, (3) readout and (4) priming. Throughout the entire cycle, the photocathode 22 is maintained at a potential of about 6000 volts negative with respect to ground.

(1) *Exposure One—writing of the first image*

During this first part of the operating cycle the target backplate 56 is set at a potential of 2 volts negative with respect to ground by connecting it to source 70 through switch 104. As the result of a previous priming phase (which will be described later) the surface of the insulating layer 58 is at ground potential. When writing of the first image commences, the mesh 54 is set at a potential of about 35 volts positive with respect to ground by connecting it to source 64 through switch 60. The electron gun 76 is turned off by opening switch 101 in the gun cathode lead 100.

The first image is written onto the target by opening the shutter 19 for a predetermined period. Light from the scene 18 is focused onto the photocathode 22 and causes electrons to be emitted in numbers proportional to the scene illumination. The electrons from the photocathode 22 are accelerated onto the target 52 where they penetrate the support layer 55 and the conductive layer 56 and pass into the insulating layer 58. In the insulatig layer, the electrons dissipate a considerable portion of their energy and liberate secondary electrons which are emitted from the surface of the insulating layer 58 and are collected by the mesh 54. This effect is called transmission secondary electron emission (TSE emission) and tends to cause exposed surface of the insulating layer 58 to charge in a positive direction.

At the same time, irradiation of the target by energetic photoelectrons causes electrons to flow into the positively charged inslulating layer 58 from the backplate 56. This flow of charge and the photoelectrons which come to rest in the insulating layer 58 tend to charge the exposed surface of the layer 58 in a negative direction. If the TSE emission current be designated $I_S$, the current flow from the backplate 56 designated $I_I$ and the photoelectron current intercepted by the insulating layer 58 designated $I_P$, then the total electron current leaving the layer 58 is given by the equation:

$$I_{OUT}=I_S-(I_P+I_I) \qquad (1)$$

Since $I_S$ is greater than $(I_P+I_I)$ with the conditions specified above, the insulating layer 58 suffers a net loss of electrons, and the surface of the layer 58 is driven from ground to a more positive potential in those areas irradiated by photoelectrons. If this process is allowed to continue unhindered, the surface of layer 58 will reach an equilibrium potential at which $I_S=I_P+I_I$. This equilibrium potential will be less than, or equal to, the potential of the mesh 54. Damage to the target may occur if the surface potential of the insulating layer 58 rises above a certain breakdown potential, characteristic of the particular target. Thus, the potential of mesh 54 may be greater than 35 volts but should not exceed the breakdown potential of the target.

Figure 2:
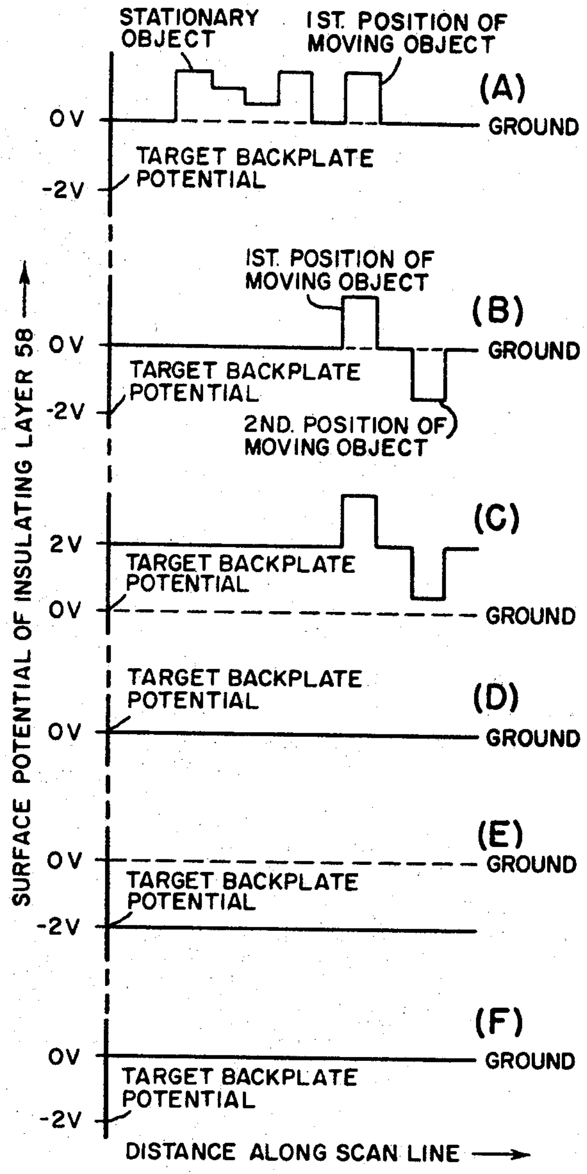
FIG. 2 is a curve representing potential distribution across the target surface in certain phases of the operation in order to explain the invention.

FIGURE 2 curve A illustrates a possible potential pattern established on the surface of layer 58 along one line scan from a scene. The first image has been written into the target. A stationary object and a moving object are present in the scene.

(2) *Exposure Two—writing of the second image*

After an integration period of the desired length for the first image, the system may be switched to writin of the second image. This is done in such a fashion that illuminated areas on the photocathode 22 cause the corresponding areas on the insulating layer 58 of the target to gain electrons. Thus, the result of writing the second image is to produce a potential distribution on the target surface 58 which is opposite in polarity to the distribution produced by the first image. During the writing of the second image, the shutter 19 remains open. The electron gun 76 is still turned off, and the potential of the target backplate 56 stays unchanged at 2 volts negative with respect to ground. Since the target backplate potential and the photocathode potential stay constant during both exposure one and exposure two, perfect registration of the two images on the target is ensured.

The only change that must precede the writing of the second image is the activation of switch 60 so as to connect the mesh 54 to the potential source 62. In this specific example, potential of the source 62 is about 300 volts negative with respect to ground.

Again, light from the scene 18 is focused onto the photocathode 22. The exact nature of the scene now imaged on the photocathode may differ from that imaged during the first exposure and the differences may arise, for example, as the result of motion by objects within the scene. Photoelectrons of the same energy as that employed for writing the first image are directed onto the target 52. They penetrate the support layer 55 and the conductive layer 56 and dissipate a large fraction of their energy in the insulating layer 58. Secondary electrons are liberated within the insulating layer as before, but, though they may leave the surface of the layer 58, they cannot flow to the mesh 54 as the latter is some 300 volts more negative than the target surface. Thus, they must return to the insulating layer 58, and the net TSE current $I_S$ leaving the target is zero. To prevent a loss of resolution in the charge pattern deposited on the insulating layer 58, it is important that the returned secondaries land close to their point of origin. Redistribution of the secondary electrons can be kept at a minimum by maintaining a large repelling electric field at the surface of the insulating layer 58 during the writing of the second image. To this end, it may be desirable to increase the negative potential on the mesh 54 to a value greater than, and to decrease the target 52 to mesh 54 spacing to a value less than, the relevant values noted previously herein.

As long as the surface of the insulating layer 58 is more positive than the backplate 56 and bombardment of the target 52 by high energy photoelectrons continues, electrons will flow into the insulating layer from the backplate. This backplate current, $I_I$, and the photoelectron current, $I_P$, tend to charge the layer in a negative direction. Since the TSE emission is now zero ($I_S=0$), it follows from Equation 1 that there will be a net flow of electrons into the layer $$I_{OUT}=-(I_P+I_I) \qquad (2)$$

Parts of the target exposed to irradiation by photoelectrons during the writing of the second image will be driven to a more negative potential. Consider first those areas where an image on the photocathode produced a corresponding positive potential distribution during the writing of the first image. If the same image is present during the second exposure period and if this exposure period is of the correct duration, then the target surface will be returned to ground potential. Consider next those areas where an image was present during the first exposure but was not present durnig the second exposure. A residual positive-going potential distribution will be found on the target.

Finally consider those areas of the target where no image was present during the first exposure but an image was present during the second exposure. A residual negative-going potential distribution will be found on the target. These three cases are illustrated in curve B of FIGURE 2 which shows a possible potential pattern established on the surface of layer 58 along one line scan from a scene. Both the first and second exposures have been completed. A stationary and a moving object are present in the scene.

(3) *Readout*

The next phase of the operating cycle is the read-out of the residual charge on the target surface. During readout the shutter 19 is closed, and no light is allowed to fall on the photocathode 22. The mesh 54 is set at a potential of about 35 volts positive with respect to ground by reconnecting it to source 64 through switch 60. To ensure that both positive-going and negative-going potential distributions are read out from the target, the potential on the backplate 56 is raised from 2 volts negative with respect to ground to ground potential by connecting the backplate lead 66 to ground through switch 104. FIGURE 2C illustrates the potential distribution along a scan line on the target after the backplate potential has been raised but before scanning commences.

Figure 3:
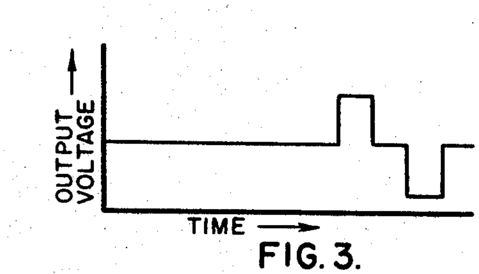
FIG. 3 shows a potential curve.

The electron gun 76 is then turned on by closing switch 101 in the gun cathode lead 100, and the electron beam from the gun is scanned in a raster over the target surface. The beam returns the exposed surface of the layer 58 to the potential of the cathode 78, which is at ground, in a single frame scan. The deposition of charge from the reading beam onto the surface of layer 58 causes a capacitively coupled signal current to flow in the load resistor 69. The voltage developed across the load resistor 69 by the signal current is shown in FIG. 3. In those areas of the target where identical images were present in the first and second exposures, a signal current corresponding to a certain gray level in the displayed picture will be generated. In areas of the target where an image was present only during the first exposure, a larger current corresponding to a white level in the displayed picture will be generated. In areas of the target where an image was present only during the second exposure, a current will be generated which is smaller than that corresponding to the grey level. This latter current will correspond to a black level in the displayed picture. The potential distribution along a scan line on the target at the end of the readout process is shown in curve D FIGURE 2.

(4) *Priming*

A priming phase is now required to restore the surface potential of the target to its initial condition. First the target backplate potential is returned to a value of 2 volts negative with respect to ground by connecting the backplate lead 66 to source 70 through switch 104. The mesh 54 is maintained at a potential of about 35 volts positive with respect to ground. The electron gun 76 is left on but, as the potential of the insulating layer 58 also drops by two volts when the target backplate potential is lowered, the reading beam can no longer land on the insulating layer, and its potential suffers no further change. This situation is illustrated in curve E of FIG. 2.

With the shutter 19 closed, the photocathode is now uniformly flooded with light from the light source 103. Irradiation of the target 52 by photoelectrons produces TSE emission which drives the target surface positive until it reaches gun cathode potential (ground). The reading beam then lands on the surface of the insulating layer 58 and prevents it from charging to a more positive potential. The photocathode flooding source 103 is turned off, the electron gun is turned off by opening switch 101, and the system is ready for a new operating cycle. Curve F of FIG. 2 shows the potential pattern established on the surface of layer 58 at this instant in time.

Perfect compensation of two identical images with no residual charge pattern left on the target may be obtained either by adjusting the relative lengths of the two exposure periods or by altering the relative efficiency with which charge is added to, or subtracted from, the insulating layer 58. Changes in the relative efficiency of addition and subtraction may be effected by adjusting the potential of the target backplate 56 and/or the potential of the mesh 54. Making the backplate potential more negative during exposures one and two increases the current flow from the backplate, $I_I$, and improves the relative efficiency of the subtraction process. Making the mesh potential more positive during the writing of the first image increases the TSE emission, $I_S$, and improves the relative efficiency of the addition process.

A modified version of the operating cycle described above may be carried out in synchronism with the standard television frame rate. By combining part of the priming cycle with the exposure required to write the first image, the complete cycle can be completed in the time required for three frames of a normal television scan. One frame in three is devoted to readout. In this mode of operation, no shuttering of the photocathode is needed.

In certain applications it may be neither necessary nor desirable to increase the target backplate potential before readout commences. If the backplate potential remains constant throughout the operating cycle, the only source of an output signal will be an image which is present in a particular area during the first exposure but not during the second. Thus differences between the first and second images will be seen in the displayed picture as white areas against a generally black background. This mode of operation is suited to the simple indication of a moving object by reading out the residual signal on the target without the use of deflection circuitry or video amplifiers.

An alternative method is available for charging the target surface positive during priming. The reading beam is permitted to strike the insulating layer 58 with an energy greater than that corresponding to first crossover potential. Under these conditions, the secondary electron emission current generated by the reading beam is greater than the beam current itself, and the insulating layer charges positive. The flooding source 103 is no longer needed to carry out the priming operation.

While there have been shown and described what are considered to be the preferred embodiments of the invention, modifications thereto will readily occur to those skilled in the art. It is not desired therefore, that the invention be limited to the specific arrangements shown and described and it is intended to cover in the appended claims all such modifications which fall within the true spirit and scope of the invention.

I claim as my invention:

1. In combination, a cathode ray tube having target assembly, said target assembly including a layer of storage material exhibiting the property of transmission secondary electron emission wherein impingement of electrons on a first surface of said transmission secondary electron emissive layer generates secondary electrons within said layer of material which are emitted from a second surface, an electrical conductive means provided on said first surface for replenishment of electrons emitted from said second surface of said transmission secondary electron emissive layer, an electrically conductive mesh positioned adjacent said second surface for controlling the transmission secondary emission from said second surface, means for directing a first electron image onto said first surface of said transmission secondary electron emissive layer through said electrical conductive electron replenishment means to generate secondary electrons within said transmission secondary electron emission layer and means for establishing a potential on said electrically conductive mesh with respect to said second surface to cause a net loss of electrons from said transmission secondary electron emissive layer and accordingly charge said second surface in a positive direction, means for directing a second electron image onto the said first surface of said transmission secondary electron emissive layer through said electrically conductive electron replenishment means to generate secondary electrons within said transmission secondary electron emissive layer and means for establishing a potential between said electrically conductive mesh and said second surface to cause a net gain of electrons at said second surface and accordingly charge said second surface in a negative direction, and means for directing an electron beam onto said second surface and for deriving an electrical signal from said electrically conductive electron replenishment means representative of the difference in signal established on said target assembly due to directing said first and second electron images thereon.

2. The method of operating a cathode ray storage tube of the type having a target assembly comprising a layer of storage material exhibiting the property of transmission secondary electron emission wherein primary electrons bombarding a first surface of said layer of storage material generate secondary electrons therein and emit secondary electrons from a second surface of said layer of storage material, said target assembly further including a layer of electrically conductive electron replenishment means on said first surface of said layer of storage material and an electrically conductive mesh collector spaced from said second surface of said layer of storage material which comprises the steps of directing a first electron image at a first velocity through said electrically conductive electron replenishment means and into said storage layer to produce secondary electrons therein which are emitted from said second surface and collected by said electrically conductive mesh collector which is at a first potential more positive than said second surface to accordingly charge said second surface in a positive direction, directing a second electron image at the same velocity as said first velocity into said storage to generate secondary electrons therein with said electrically conductive collector mesh being at a second potential more negative than said second surface to suppress the emission of secondary electrons from said second surface of said transmission secondary emissive layer and accordingly charge said second surface in a negative direction so as to substantially subtract the charge image written in by said second electron image from the charge image written in by said first electron image and directing an electron beam onto said second surface to derive a signal therefrom representative of the difference in charge images established therein by said first and second electron images.

3. In combination, a cathode ray tube having target assembly, said target assembly including a layer of storage material exhibiting the property of transmission secondary electron emission wherein impingement of electrons on a first surface generates secondary electrons within the material which are emitted from a second surface, an electrical conductive means provided on said first surface for replenishment of electrons emitted from said second surface of said storage layer, an electrically conductive mesh positioned adjacent said second surface for controlling the transmission secondary electron emission from said second surface, means for directing a first electron image onto said first surface of said layer through said electrical conductive electron replenishment means to generate secondary electrons within said storage layer and means for establishing a potential on said electrically conductive mesh with respect to said second surface to cause a net loss of electrons from said storage layer due to the emission of electrons from said second surface dominating the charging of said storage layer to charge said second surface in a positive direction, means for directing a second electron image onto the said first side of said transmission secondary emissive layer through said electrically conductive electron replenishment means to generate secondary electrons within said storage layer and means for establishing a potential between said electrically conductive mesh and said second surface to cause a net gain of electrons at said second surface by suppression of emission of electrons from said second surface to charge said second surface in a negative direction, and means for directing an electron beam onto said second surface to derive an electrical signal from said storage layer representative of the difference in charge established on said target assembly due to directing said first and second electron images thereon.

4. The method of operating a cathode ray storage tube of the type having a target assembly comprising a layer of storage material exhibiting the property of transmission secondary electron emission wherein primary electrons bombarding a first surface of said layer of storage material generate secondary electrons therein and emits secondary electrons from a second surface of said layer of storage material, said target further including a layer of electrically conductive electron replenishment means on said first surface of said storage layer and a collector mesh of electrically conductive material spaced from the second surface of said storage layer comprising the steps of directing an electron beam representative of a first image at a first velocity through said electrically conductive electron replenishment means and into said storage layer to produce secondary electrons with said collector mesh at a first potential with respect to said second surface to charge said second surface in a first direction, directing an electron beam representative of a second image at the same velocity as said first velocity into said storage layer to generate secondary electrons therein with said collector mesh being at a second potential with respect to said second surface of said storage layer to charge said second surface in a direction opposite to said first direction to substantially subtract the charge image written in by said second image from the charge written in by said first image and directing an electron beam onto said second surface to derive a signal therefrom representative of the difference in charge images established therein by said first and second images.

5. In combination, a cathode ray tube having target assembly, said target assembly including a storage layer of material exhibiting the property of transmission secondary electron emission wherein impingement of electrons on a first surface generate secondary electrons within the material which are emitted from a second surface, an electrical conductive means provided on said first surface for replenishment of electrons emitted from said second surface of said storage layer, an electrically conductive collector mesh spaced from and facing said second surface for controlling the transmission secondary emission from said second surface, a photocathode spaced from and facing said first surface, means for directing a first scene onto said photocathode to generate a first electron image, means for directing said first electron image onto said first side of said storage layer through said electrical replenishment means to generate secondary electrons within said storage layer, means for connecting a first potential source to said collector mesh to charge said second surface in a first direction, means for directing a second scene onto said photocathode to generate a second electron image, means for directing the second electron image onto said first side of said storage layer through said electrically conductive electron replenishment means to generate secondary electrons within said storage layer, means for connecting a second potential source to said electrically conductive mesh to charge said second surface in an opposite direction with respect to said first direction, and means for directing an electron beam onto said second surface to read out an electrical signal from said electrically conductive electron replenishment means indicative of differences in said first and second scenes.

6. The method of operating a cathode ray storage tube of the type having a target assembly comprising a layer of storage material exhibiting the property of transmission secondary electron emission wherein primary electrons bombarding a first surface of said storage layer generate secondary electrons therein and emits secondary electrons from a second surface of said storage layer, said target further including a layer of electrically conductive electron replenishment means on said first surface of said storage layer, a collector mesh of electrically conductive material spaced from said second surface of said storage layer, which comprises the steps of establishing a first potential on the second surface of said storage layer, establishing a second potential on said electron replenishment means negative with respect to said first potential, directing a first electron image at a first velocity through said electron replenishment means and into said storage layer to produce secondary electrons therein, establishing a third potential on said collector mesh to charge the second surface in a first direction with respect to said first potential and establish a first charge image thereon corresponding to said first electron image, directing a second electron image of the same velocity as said first velocity into said storage layer to generate secondary electrons therein, establishing a fourth potential on said collector mesh to charge said second surface in a direction opposite with respect to said first direction to write a second charge image corresponding to said second electron image to thereby cancel similar information in said first charge image, and directing an electron beam onto said second surface to derive a signal therefrom representative of the difference information in said charge images established therein by said first and second electron images.

7. In combination, a cathode ray tube having target assembly, said target assembly including a storage layer of porous storage material exhibiting the property of transmission secondary electron emission wherein impingement of electrons on a first surface generates secondary electrons within the material which are emitted from a second surface, an electrical conductive means provided on said first surface for replenishment of electrons to said storage layer, an electrically conductive collector mesh spaced from and facing said second surface for controlling the transmission secondary emission from said second surface, a photocathode spaced from and facing said first surface, means for directing a first scene onto said photocathode to generate a first electron image, means for directing said first electron image onto said first side of said storage layer through said electrical replenishment means to generate secondary electrons within said storage layer, means for connecting a first potential source to said collector mesh to charge said second surface in a first direction, means for directing a second scene onto said photocathode to generate a second electron image, means for directing the second electron image onto the said first side of said storage layer through said electrically conductive electron replenishment means to generate secondary electrons within said storage layer, means for connecting a second potential source to said electrically conductive mesh to charge said second surface in an opposite direction with respect to said first direction, means for directing an electron beam onto said second surface to read out an electrical signal from said electrically conductive electron replenishment means indicative of differences in said first and second scenes, and means for suppressing input to said photocathode during said read out operation.

8. The method of operating a cathode ray storage tube of the type having a target assembly comprising a layer of storage material exhibiting the property of transmission secondary electron emission wherein primary electrons bombarding a first surface of said storage layer generate secondary electrons therein and emits secondary electrons from a second surface of said storage layer, said target further including a layer of electrically conductive electron replenishment means on said first surface of said storage layer, a collector mesh of electrically conductive material spaced from said second surface of said storage layer, which comprises the steps of establishing a first potential on the second surface of said storage layer, establishing a second potential on said electron replenishment means negative with respect to said first potential, directing a first electron image at a first velocity through said electron replenishment means and into said storage layer to produce secondary electrons therein, establishing a third potential on said collector mesh to charge the second surface in a first direction with respect to said first potential and establish a first charge image thereon corresponding to said first electron image, directing a second electron image of the same velocity as said first velocity into said storage layer to generate secondary electrons therein, establishing a fourth potential on said collector mesh to charge said second surface in a direction with respect to said first direction to write a second charge image corresponding to said second electron image to thereby cancel similar information in said first charge image, and establishing a fifth potential on said electron replenishment means positive with respect to said second potential while simultaneously directing an electron beam onto said second surface to derive a signal therefrom representative of the difference information in said charge images established therein by said first and second electron images.

References Cited

UNITED STATES PATENTS

| | | | |
|---|---|---|---|
| 2,953,712 | 9/1960 | Klotzbaugh | 315—12 |
| 3,290,546 | 12/1966 | Link et al. | 315—12 |
| 3,290,674 | 12/1966 | Calhoon | 343—5 |

RODNEY D. BENNETT, *Primary Examiner.*

J. P. MORRIS, *Assistant Examiner.*